United States Patent [19]
Wakazu

[11] Patent Number: 6,006,287
[45] Date of Patent: Dec. 21, 1999

[54] DMA TRANSFER OF AN INTERLEAVED STREAM

[75] Inventor: Yutaka Wakazu, Tokyo, Japan

[73] Assignee: NEC Corporation, Tokyo, Japan

[21] Appl. No.: 08/954,313

[22] Filed: Oct. 20, 1997

[30]     Foreign Application Priority Data

Oct. 18, 1996  [JP]  Japan ................................ 8-297596

[51] Int. Cl.⁶ .............................. G06F 13/28; H04N 7/12
[52] U.S. Cl. ............................................. 710/22; 348/423
[58] Field of Search ............................... 710/22–28, 117,
710/124; 345/502, 526; 348/845, 423, 715,
390; 709/236; 370/442, 478, 480

[56]            References Cited

U.S. PATENT DOCUMENTS 5,388,237  2/1995  Sodos ........................................ 710/22
5,715,176  2/1998  Mobini ................................... 709/236

FOREIGN PATENT DOCUMENTS

62-79558  4/1987  Japan .
64-59445  3/1989  Japan .
2-278361  11/1990  Japan .

*Primary Examiner*—John A. Follansbee
*Attorney, Agent, or Firm*—Foley & Lardner

[57]            ABSTRACT

A DMA transfer system includes a multiplexer for multiplexing DMA requests from a plurality of processors, a flag for changing over between an operation in which a stream ID is removed from a data stream before the data stream is transferred to a requesting processor or an operation in which the data stream is transferred to the requesting processor with the stream ID left added on, ID registers the number of which is the same as the number of processors, acknowledge controllers, the number of which is the same as the number of processors and which are provided to correspond to respective ones of the processors, for controlling a DMA acknowledge signal and access control signal to the processors in accordance with DMA acknowledge signals from a DMA controller, and a stream ID detector for comparing stream IDs in the stream ID registers and data streams transferred by DMA, switching between enabling/disabling of the acknowledge controllers based upon the value of the flag and results of comparison, and outputting a data stream.

20 Claims, 10 Drawing Sheets

PRIOR ART

FIG. 10

PRIOR ART

DMA TRANSFER OF AN INTERLEAVED STREAM

FIELD OF THE INVENTION

This invention relates to a data transfer system and, more particularly, to a system for transferring data streams, the number of types of which is greater than the number of DMA (Direct Memory Access) channels used in DMA data transmission.

BACKGROUND OF THE INVENTION

Examples of prior art wherein data streams of a number of types greater than the number of DMA channels are transferred are disclosed in the specifications of Japanese Patent Application Laid-Open (KOKAI) Nos. JP-A-62-79558, 64-59445 and 2-278361.

In DMA transfer according to the prior art set forth in these specifications, one DMA request signal output from each of a number of data processors which issue DMA requests and one DMA acknowledge signal sent to the data processor are validated so that DMA requests of a number greater than the actual number of DMA channels can be processed.

Figure 8:
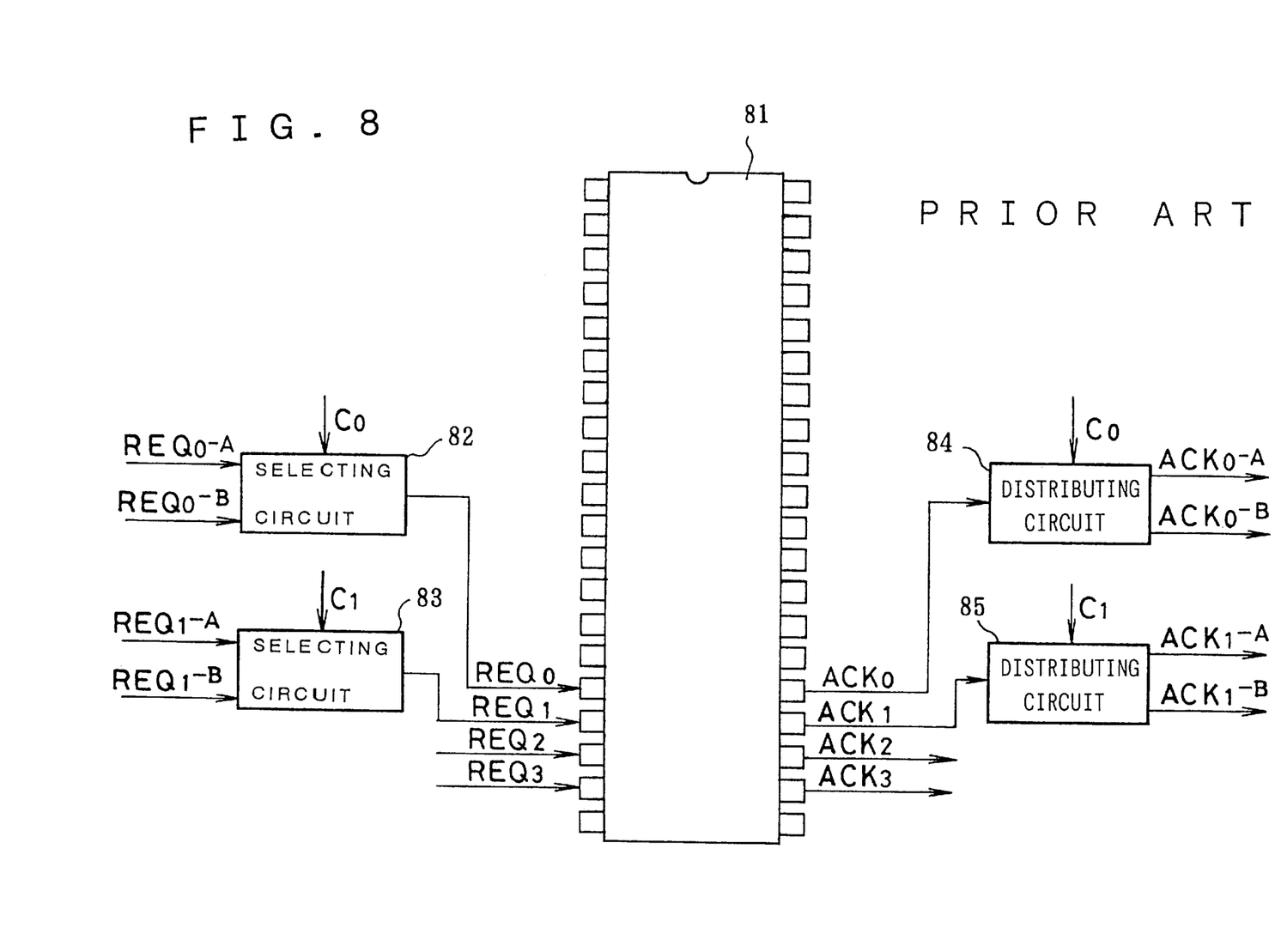
FIG. 8 is a diagram showing the an arrangement according to the prior art.

For example, the specification of Japanese Patent Application Laid-Open JP-A-62-79558 proposes a DMA controller arrangement in which data transfer by a large number of channels is made possible by externally connecting distributing circuits which distribute outputs to any one of a plurality of different peripheral devices, with the number of distributing circuits conforming to the requisite number of channels. More specifically, as shown in FIG. 8, one set of DMA request signals is selected by a DMA request signal selecting circuit 82 based upon a control signal Co, one DMA acknowledge signal is selected from several DMA acknowledge signals based upon the same control signal Co, and processing of DMA requests of a number greater than the number of channels of a DMA controller 81 is executed.

Figure 9:
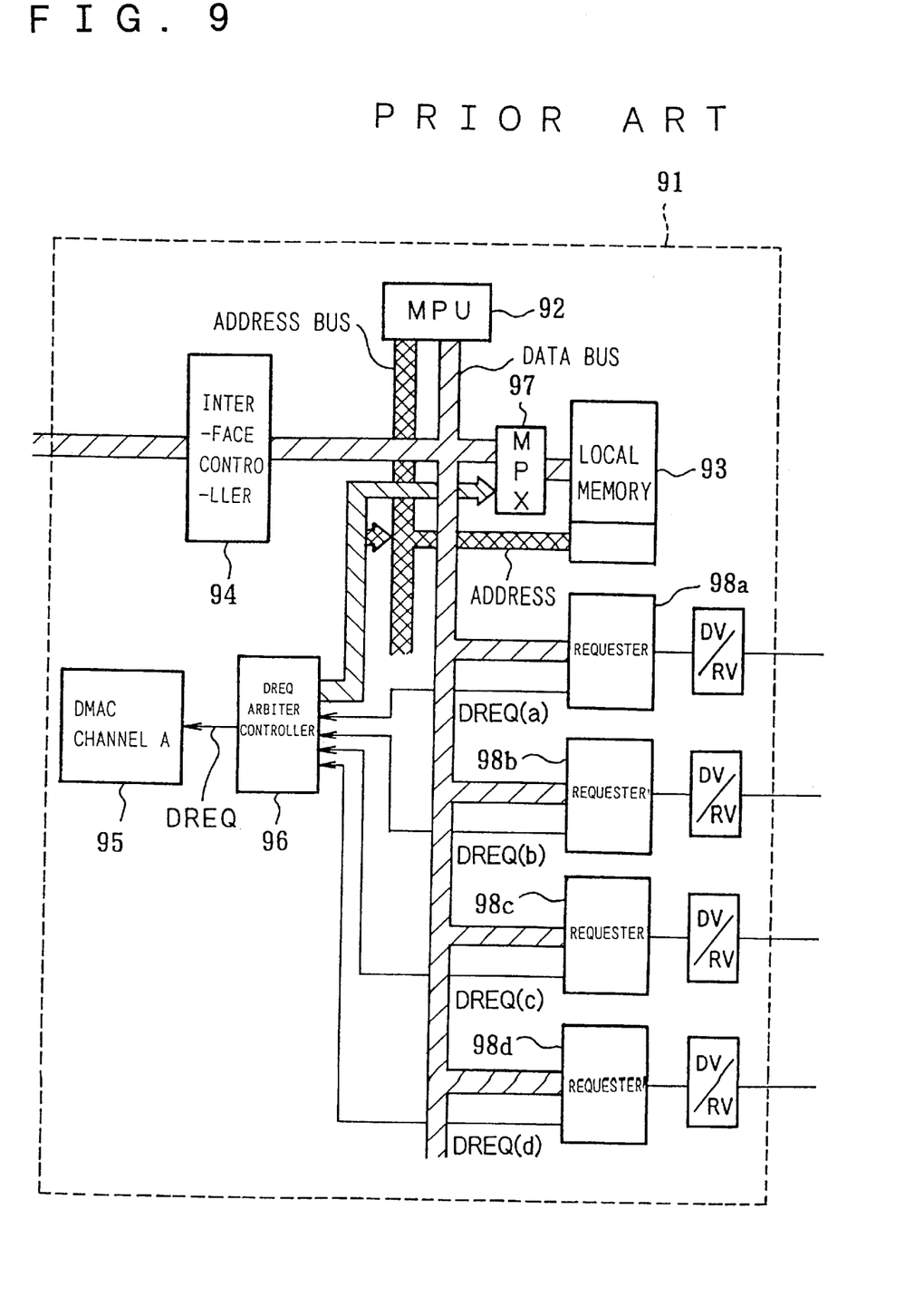
FIG. 9 is a diagram showing an arrangement according to another example of the prior art.

Further, the specification of Japanese Patent Application Laid-Open JP-A-64-59445 discloses DMA transfer control in an adapter designed so as to be capable of processing data requests from a plurality of requesters using a DMA controller having one channel. As shown in FIG. 9, one set of DMA request signals and DMA acknowledge signals is selected by a DREQ arbiter controller 96 from several DMA request signals and DMA acknowledge signals, and processing of DMA requests of a number greater than the number of channels of the DMA controller is executed. That is, data transfer requests DREQ(a), (b), (c), (d) from many requesters are entered into a DMA controller DMAC 95 as one DREQ by the DREQ arbiter controller 96, and ID information is utilized upon being added onto data or an address. For example, at the time of a DMA transfer from an input/output unit to a memory, ID information from the DREQ arbiter controller 96 is written to a local memory 93 via a multiplexer MPX 97 in an initial cycle, and DMA data from a requester that has been selected by the DREQ arbiter controller 96 is written to the local memory 93 via the multiplexer 97 in the next cycle.

Figure 10:
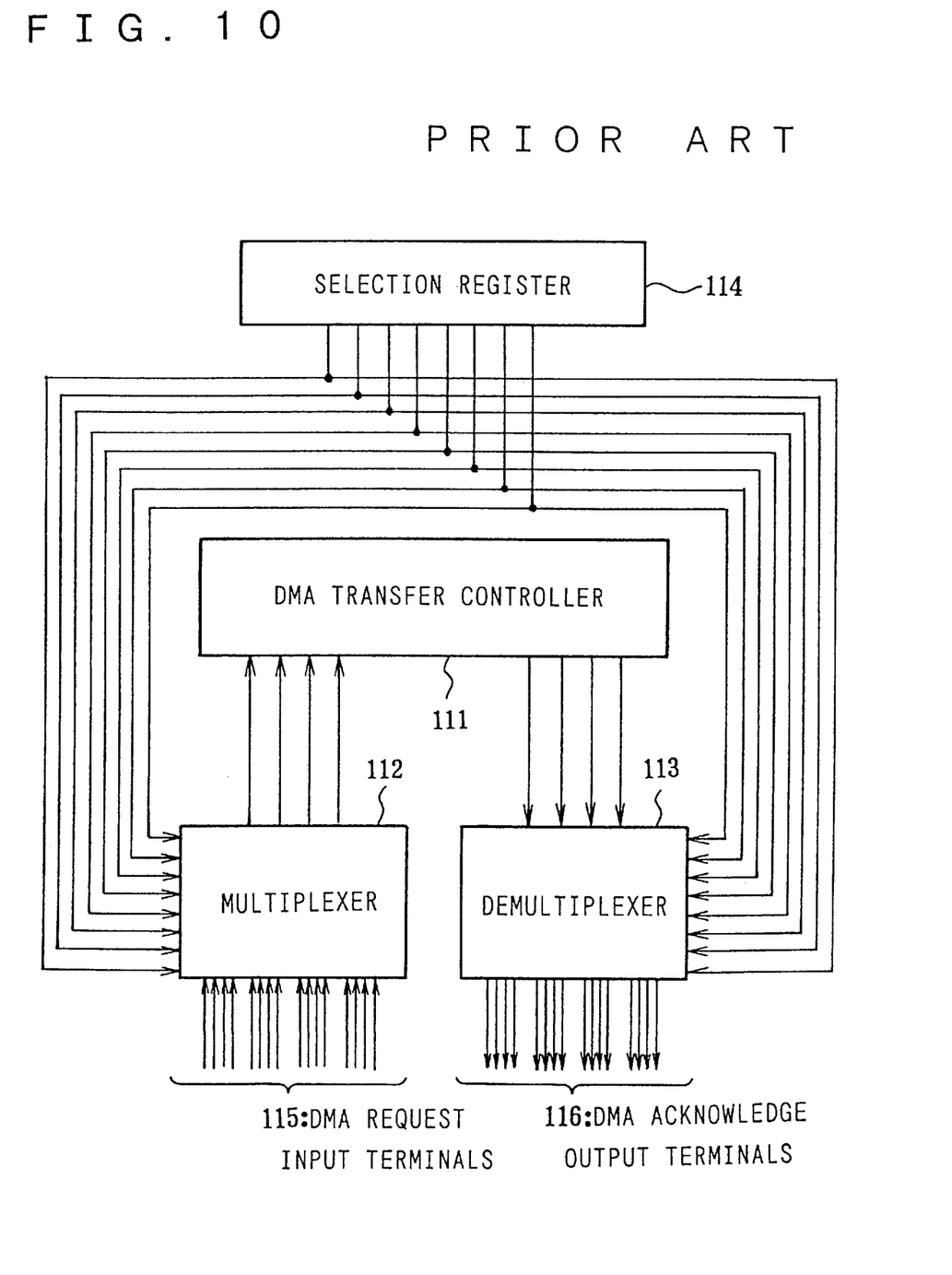
FIG. 10 is a diagram showing an arrangement according to still another example of the prior art.

As shown in FIG. 10, the specification of Japanese Patent Application Laid-Open JP-A-2-278361 discloses an arrangement in which DMA request input terminals 115 in a DMA controller are equipped with a multiplexer 112 and DMA acknowledge output terminals 116 are equipped with a demultiplexer 113, thereby making it possible to connect a large number of DMA transfer requesting devices while suppressing an increase in the amount of hardware within the DMA controller. One set of DMA request signals and DMA acknowledge signals is selected based upon a value stored in a selection register 114 and processing of DMA requests of a number greater than the number of channels of a DMA controller is executed.

SUMMARY OF THE DISCLOSURE

According to the investigation towards the present invention, the following problems have been encountered.

In a case where data of a plurality of types are included in one data stream in interleaved form, a problem which arises in the prior art described above is that the data stream cannot be separated according to each type of data.

Figure 6:
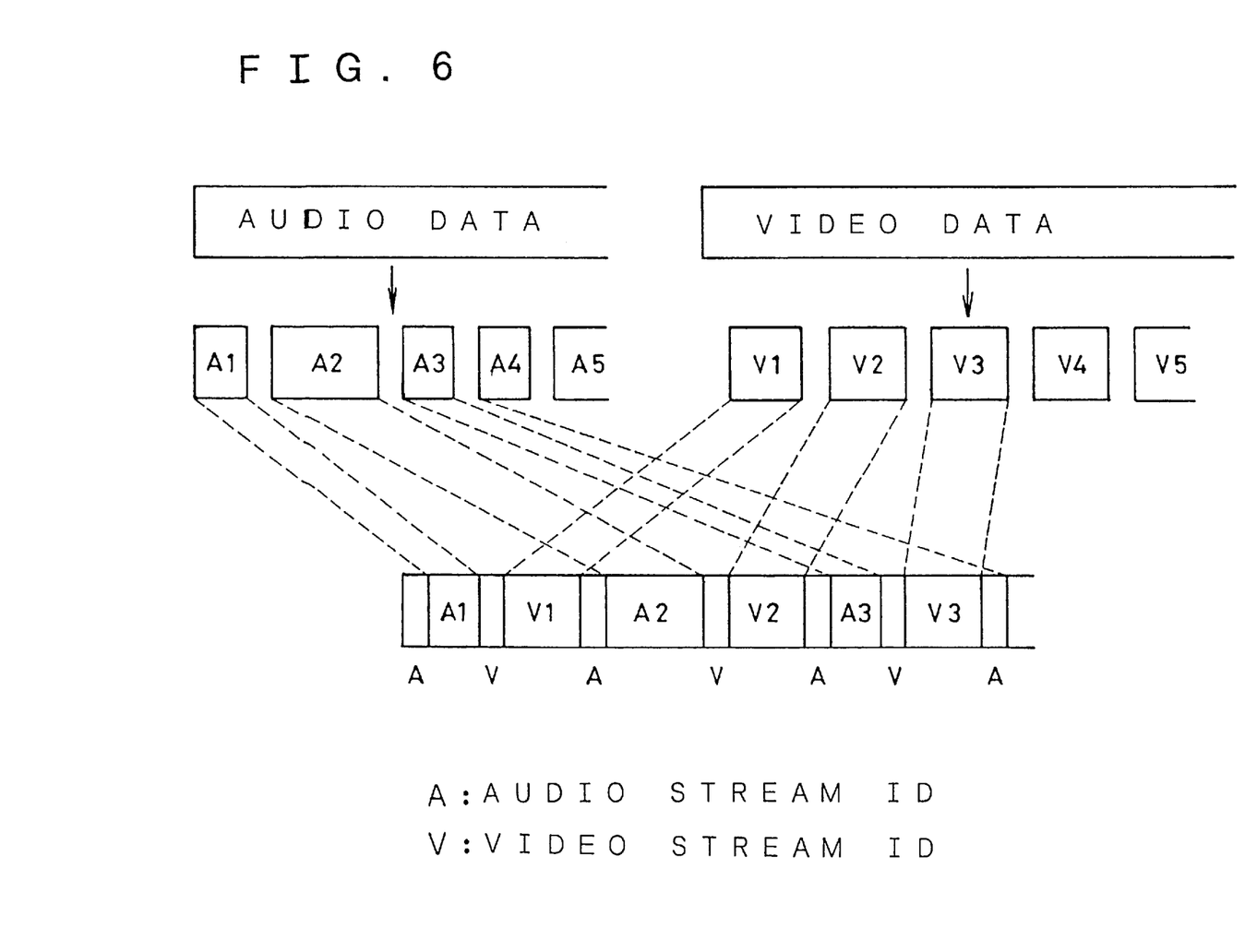
FIG. 6 is a diagram schematically showing the interleaving of a plurality of types of data in an embodiment of the invention taking audio data and video data as an example.

More specifically, DMA transfer control according to the prior art described above is such that in a case where a video data processor and an audio data processor output DMA request signals with respect to a data stream having interleaved audio data and video data, as shown for example in FIG. 6, the video data and audio data cannot be separated from each other and distributed to the proper processors.

In order to transfer a data stream having interleaved audio and video data in the prior art, it is required that a central processor (CPU) separate the video data and audio data and transfer the audio data and video data in alternating fashion. This imposes a large load upon the CPU.

Accordingly, an object of the present invention is to provide a DMA data transfer system, apparatus or method through which the transfer of a variety of interleaved data can be realized by a small number of DMA channels without imposing a large load upon the CPU.

Another object of the present invention is to provide a DMA data transfer system, apparatus or method which makes it possible to transfer a plurality of data streams in memory by DMA channels the number of which is smaller than the number of data streams.

Further objects of the invention will become apparent in the entire disclosure.

According to the present invention, the foregoing objects are attained by providing a DMA transfer system having DMA request signal and DMA acknowledge signal selecting means and stream ID detecting means, whereby a stream ID is detected from a data stream in which a plurality of types of data have been interleaved and, on the basis of the detected stream ID, corresponding data is separated from the data stream and distributed to a DMA transfer requesting device that corresponds to this ID.

More specifically, according to one aspect of the present invention, there is provided a DMA transfer system comprising a multiplexer for multiplexing DMA request signals from a plurality of peripheral units (DMA requesting units) such as processors requesting DMA, a stream add-on control information storage unit for changing over between a first operation mode in which a stream ID is removed from a data stream and the data is then transferred to a peripheral unit (data processor) or a second operation mode in which a data stream is transferred to a peripheral unit (data processor) with the stream ID left added on, a stream ID register capable of registering stream IDs the number of which is the same as the number DMA requesting units (processors), acknowledge controllers, the number of which is the same as the number of DMA requesting units (processors) and which are provided to correspond to the DMA requesting units (processors), for controlling a DMA acknowledge signal and access control signal to each DMA requesting unit in accordance with a DMA acknowledge signal from a DMA controller, and a stream ID detector for comparing a plurality of stream IDs that have been stored in the stream ID register and data streams transferred by DMA, switching between enabling/disabling of acknowledge controllers based upon a value in the stream add-on control information storage unit and results of comparison, and outputting a data stream.

Further, the present invention is such that if, in a case where a specific DMA requesting unit (processor) is temporarily not outputting a DMA request signal, data with respect to this DMA requesting unit (processor) has been transferred, data buffering processing is executed for each DMA requesting unit (processor) in order to perform the data transfer correctly.

More specifically, according to another aspect of the present invention, a data buffer is provided for every periphery unit (processor), the stream ID detector writes data to the buffers, and an acknowledge controller reads data out of a data buffer in response to a DMA request from the corresponding DMA requesting unit (processor) and outputs the data to a periphery unit (data processor).

In a further aspect of the present invention there is provided a computer comprising a DMA transfer system.

The computer comprises a central processing unit CPU, a memory unit, a plurality of peripheral units issuing direct memory access (hereinafter referred to as "DMA") requests, a system bus adapted to communicate between said units, a DMA controller unit communicatable with said system bus, and controllable by said CPU, and a stream selector unit communicable with said DMA controller unit and said system bus, said stream selector unit being adapted to time-sharedly select data stream communicated with said plurality of peripheral units.

The peripheral units (DMA requesting units) may comprise data processor units, typically an audio processor unit and a video processor unit.

The stream selector unit comprises:
(a) means for detecting a stream identification from a data stream in which a plurality of types of data have been interleaved;
(b) means for, on the basis of the stream identification that has been detected, separating the corresponding data from the data stream; and
(c) means for distributing the separated data to a direct memory access transfer requesting device that corresponds to said stream identification.

In a still further aspect of the present invention, the computer may comprise any of the DMA transfer systems above mentioned, too.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will be described below. In a preferred embodiment of the invention, a DMA transfer system includes a multiplexer (102 in FIG. 1) for multiplexing DMA request signals (REQ) from a plurality of processors (108, 109) requesting DMA transfer, a stream ID add-on flag register (105 in FIG. 1) for controlling changeover between operation in which a stream ID is removed from a data stream and the data is then transferred to a processor or operation in which a data stream is transferred to a processor with the stream ID left added on, stream ID storage means (104 in FIG. 1) for storing stream IDs the number of which is the same as the number of DMA requesting processors, acknowledge controllers (A), (V) (106, 107 in FIG. 1), the number of which is the same as the number of DMA requesting processors and which are provided to correspond to the DMA requesting processors, for controlling a DMA acknowledge signal and access control signal to each DMA requesting processor in accordance with a DMA acknowledge signal from a DMA controller, and stream ID detector (103 in FIG. 1) which compares a plurality of stream IDs that have been stored in the stream ID storage means and data streams transferred by DMA, switches between enabling/disabling of acknowledge controllers based upon the value of the stream ID add-on flag register (105 in FIG. 1) and results of comparison, and outputs a data stream, wherein by detecting the stream ID of a transferred data stream, data streams of a plurality of types use one DMA channel in time-shared fashion.

In a preferred embodiment of the invention, a stream ID (see FIG. 4) that has been registered at the beginning of each item of data of a data stream in which plural items of data to be DMA transferred have been interleaved is detected, whereby each item of data is extracted from a data stream in which plural items of data have been interleaved and the extracted data is distributed to each data processor.

As a result, data such as an audio stream and a video stream interleaved in advance and constructed as one stream can be separated and distributed properly to each data processor.

Further, in accordance with an embodiment of the present invention, the stream ID of a transferred data stream is detected. As a result, not only are plural items of data in advance interleaved distributed but a specific stream ID is also added onto the beginning of the transferred data before the data is transferred. This makes it possible to process DMA requests the number of which is greater than the number of DMA channels.

In another preferred embodiment of the present invention, data buffers (207, 208 in FIG. 2) are provided for respective ones of processors (210, 211 in FIG. 2), stream detecting means (203 in FIG. 2) writes data to the data buffers, and acknowledge controllers (206, 209 in FIG. 2) read data out of the data buffers in response to DMA requests from corresponding DMA requesting processors and output the data to data processors.

The preferred embodiments of the invention will now be described in further detail with reference to the accompanying drawings.

First Embodiment

Figure 1:
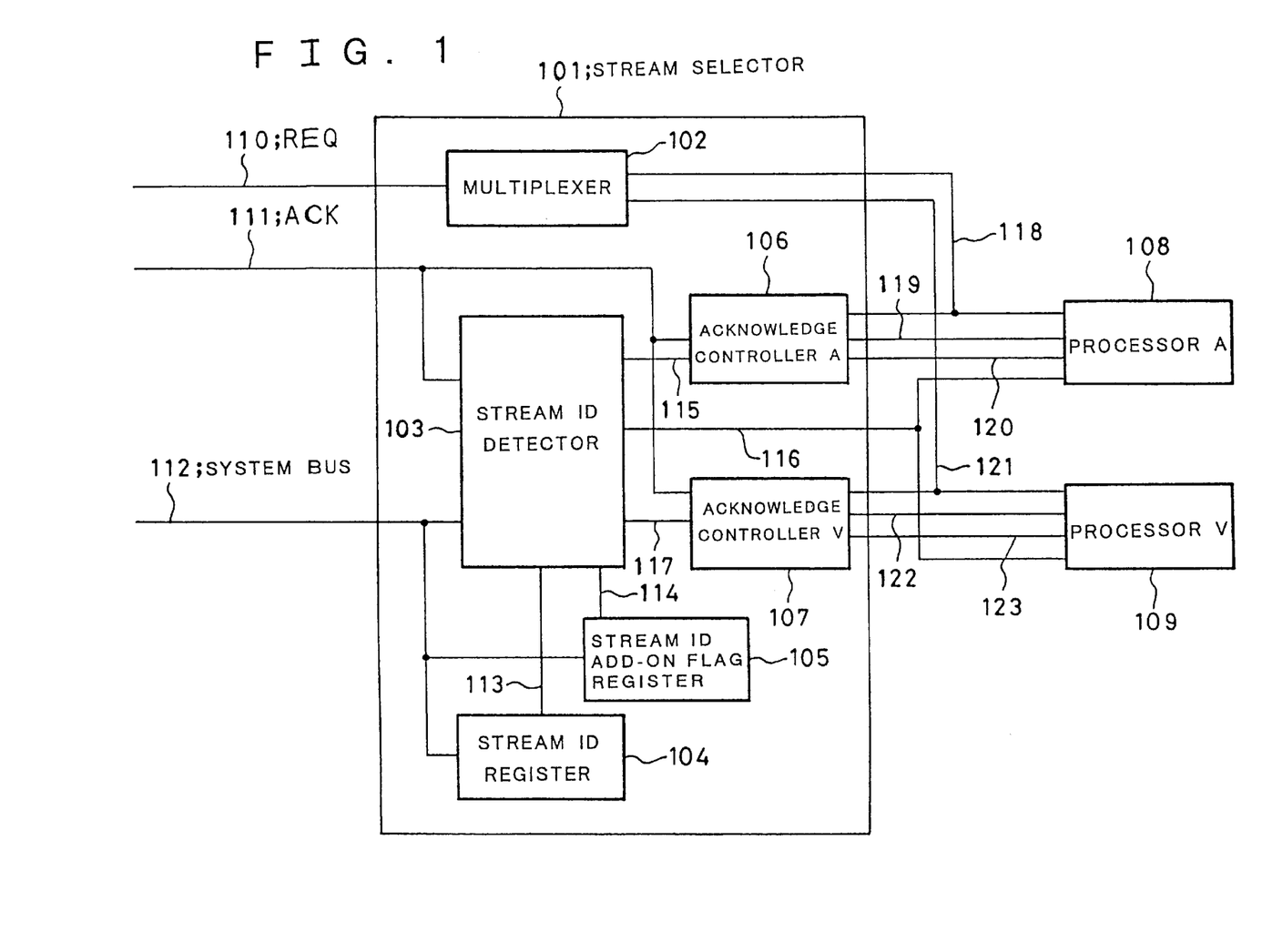
FIG. 1 is a block diagram illustrating the construction of a first embodiment of the present invention.

FIG. 1 is a block diagram showing the construction of a first embodiment of the present invention. This is a diagram useful in describing an example of an arrangement in which the present invention is applied to a system wherein two data processors use a single DMA channel and transfer data streams by DMA transfer. Though an arrangement having two data processors is shown in FIG. 1 in order to simplify the description, it goes without saying that the present invention is not limited to two data processors.

As shown in FIG. 1, the system according to this embodiment comprises a multiplexer 102 for multiplexing a DMA request signal 118 and a DMA request signal 121 from a plurality of DMA requesting processors, namely an audio processor (A) 108 and a video processor (V) 109; a stream ID add-on flag register 105 for changing over between operation in which a stream ID is removed from a data stream and the data is then transferred to a data processor or operation in which a data stream is transferred to a data processor with the stream ID left added on; a stream ID register 104 having a capacity for registering stream IDs the number of which is the same as the number DMA requesting processors; an audio acknowledge controller (A) 106 for controlling a DMA acknowledge signal 119 and an access control signal 120 to the processor 108 in accordance with a DMA acknowledge signal 111 from a DMA controller (not shown) and an acknowledge controller (A) validity signal 115 from the stream ID detector 103; the video acknowledge controller (V) 107 for controlling a DMA acknowledge signal 122 and an access control signal 123 to the processor 109 in accordance with the DMA acknowledge signal 111 from the DMA controller and an acknowledge controller (V) validity signal 117 from the stream ID detector 103; and the stream ID detector 103 for comparing a plurality of stream IDs that have been stored in the stream ID register 104 and data streams transferred from memory by DMA and, in a case where data identical with data that has been stored in the stream ID register 104 is detected, switching between enabling/disabling of the acknowledge controller validity signal 115 and the acknowledge controller validity signal 117 based upon the register number of the register in which the detected stream ID has been stored, the value in the stream ID add-on flag register 105, and outputting the data stream.

The stream ID register 104 has registers the number of which is equal to the number of acknowledge controllers 106, 107, and these registers have one-to-one correspondence with the acknowledge controllers 106, 107. By way of example, assume that a first register in the stream ID register 104 corresponds to the acknowledge controller 106 and that a second register in the stream ID register 104 corresponds to the acknowledge controller 107.

If the stream ID detector 103 has detected a stream ID stored at the address of the first register of the stream ID register 104 in the data stream sent by DMA transfer, then the stream ID detector 103 validates the acknowledge controller validity signal 115 to the acknowledge controller 106 and invalidates the acknowledge controller validity signal 117 to the acknowledge controller 107.

If the stream ID detector 103 has detected a stream ID stored at the address of the second register of the stream ID register 104 in the data stream sent by DMA transfer, then the stream ID detector 103 validates the acknowledge controller (V) validity signal 117 to the acknowledge controller (V) 107 and invalidates the acknowledge controller (A) validity signal 115 to the acknowledge controller (A) 106.

The stream ID detector 103 holds the status of the acknowledge controller validity signal until the next stream ID is detected. That is, only one of the plurality of acknowledge controller validity signals is valid. Until a valid stream ID is detected, and in a case where the stream ID add-on flag 105 is invalid, all acknowledge controller validity signals are rendered invalid with respect to data judged to be a stream ID.

In the arrangement of FIG. 1, there are two processors which issue DMA requests. In a case where there are three or more processors for processing data, the number of acknowledge controllers and the number of registers in the stream ID register 104 would be the same as the number of processors.

The operation of this embodiment of the invention will now be described in detail with reference to FIGS. 1, 3, 4 and 5.

Figure 3:
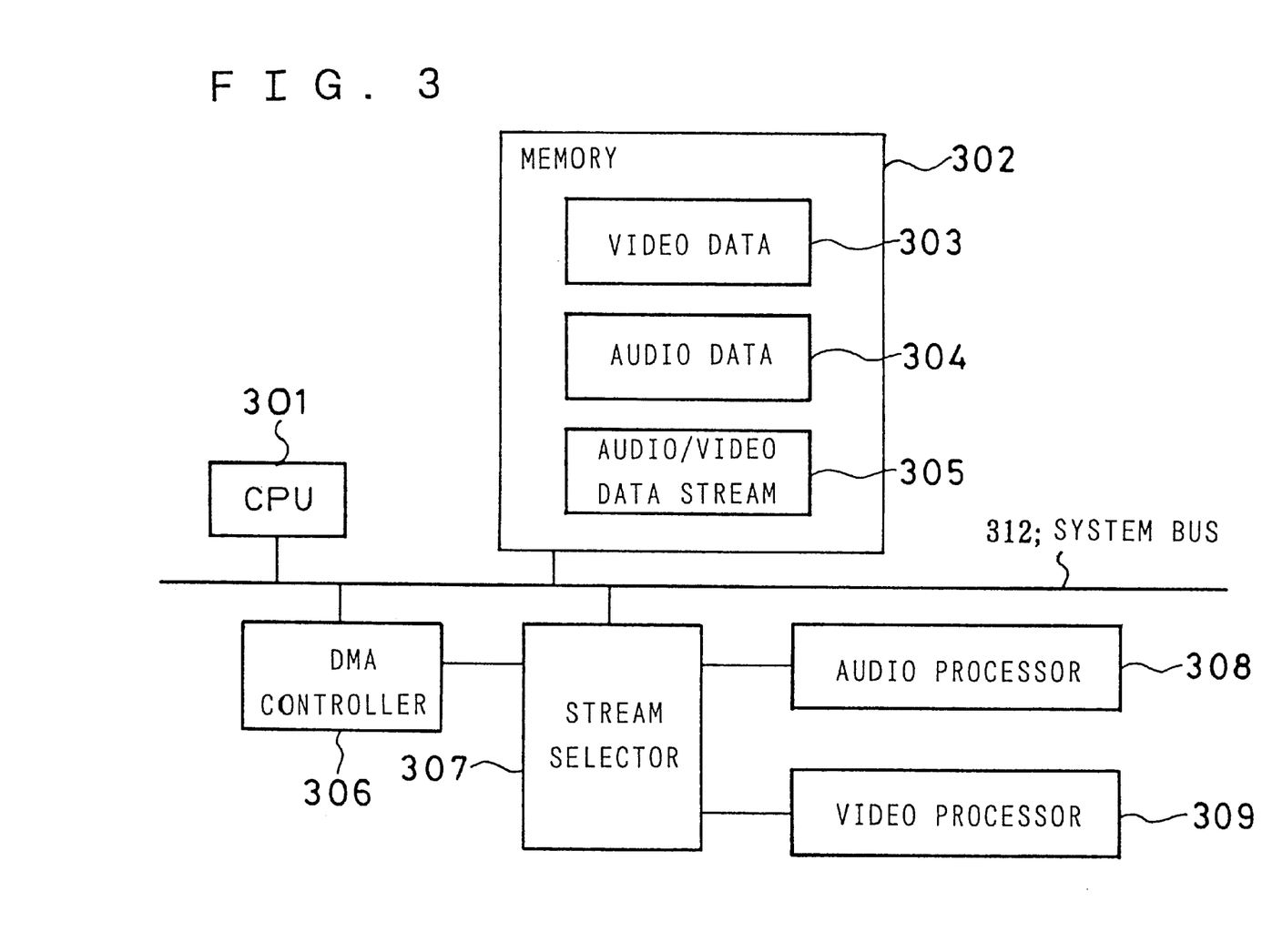
FIG. 3 is a diagram showing the configuration of a system to which an embodiment of the present invention is applied.

FIG. 3 is a diagram showing an arrangement in which the present invention is applied to a system for reproducing video data and audio data.

As shown in FIG. 3, this embodiment has a CPU 301, a memory 302, a DMA controller 306, a stream selector 307, an audio processor 308 and a video processor 309. The audio processor 308 and video processor 309 shown in FIG. 3 correspond to the processor 108 and processor 109, respectively, of FIG. 1. FIG. 1 shows the detailed construction of the stream selector 307 of FIG. 3 in the form of a block diagram. The stream selector 307 has the multiplexer 102, stream ID detector 103, stream ID register 104, stream ID add-on flag register 105 and acknowledge controllers 106, 107 depicted in FIG. 1. The description of the internal construction of the stream selector 307 will be rendered below with reference being had to FIG. 1.

Figure 4:
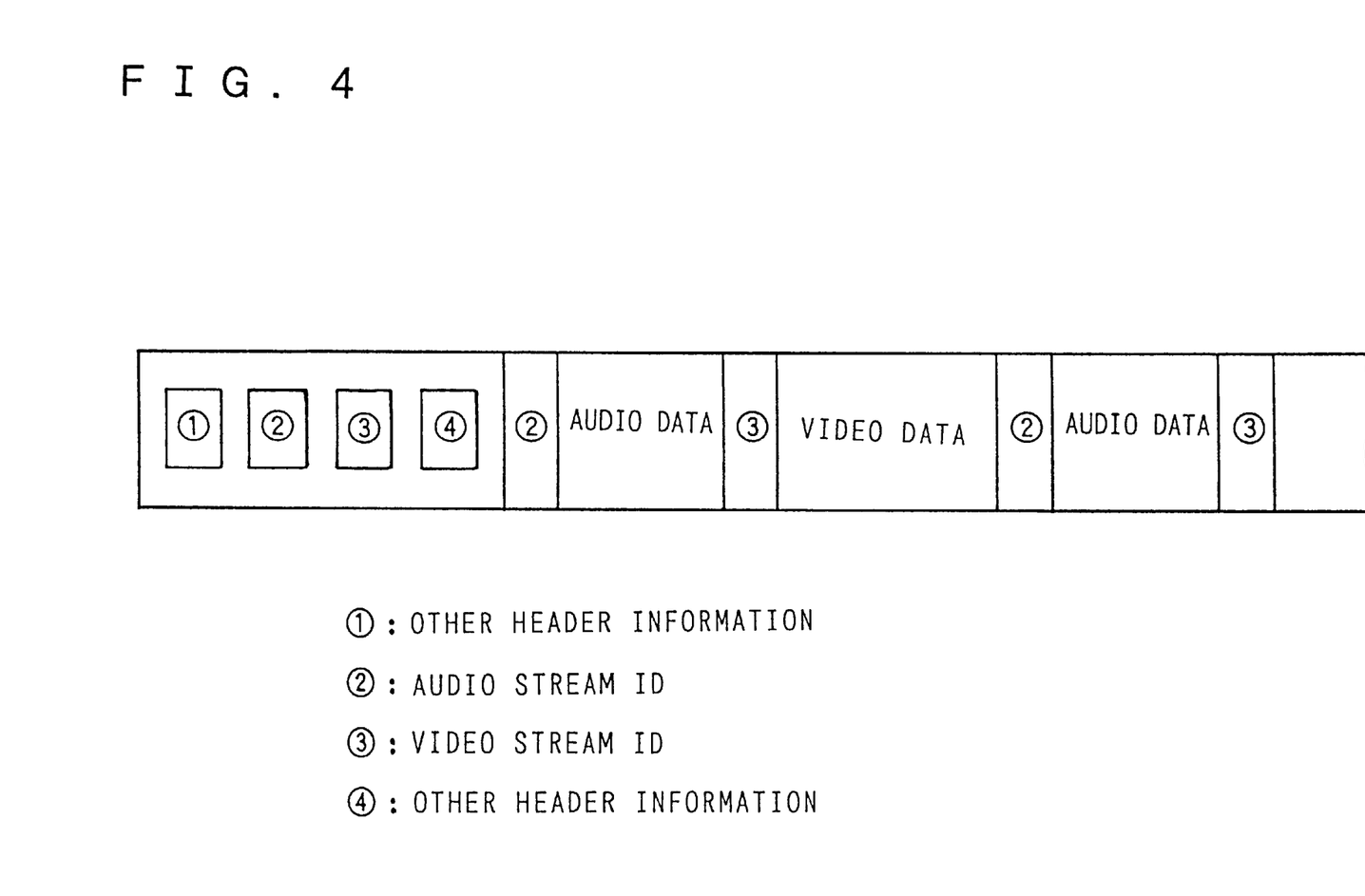
FIG. 4 is a diagram schematically showing an example in which a stream ID is added onto a data stream.

FIG. 4 is a diagram schematically showing the contents (format) of AV (audio/video) data stream 305 in which video data and audio data have been interleaved.

In this embodiment, a stream header is provided at the beginning of the AV data stream 305, as shown in FIG. 4. Stream ID numbers which indicate the contents of a stream are recorded in the stream header, with the number of IDs being equal to the number of types of data, e.g. audio data and video data, involved.

Stored following the header is data identical with the audio stream ID in the stream header, this data being placed at the beginning of each item of audio data interleaved, followed by data identical with the video stream ID in the stream header, this data being place at the beginning of each item of video data interleaved.

Figure 5:
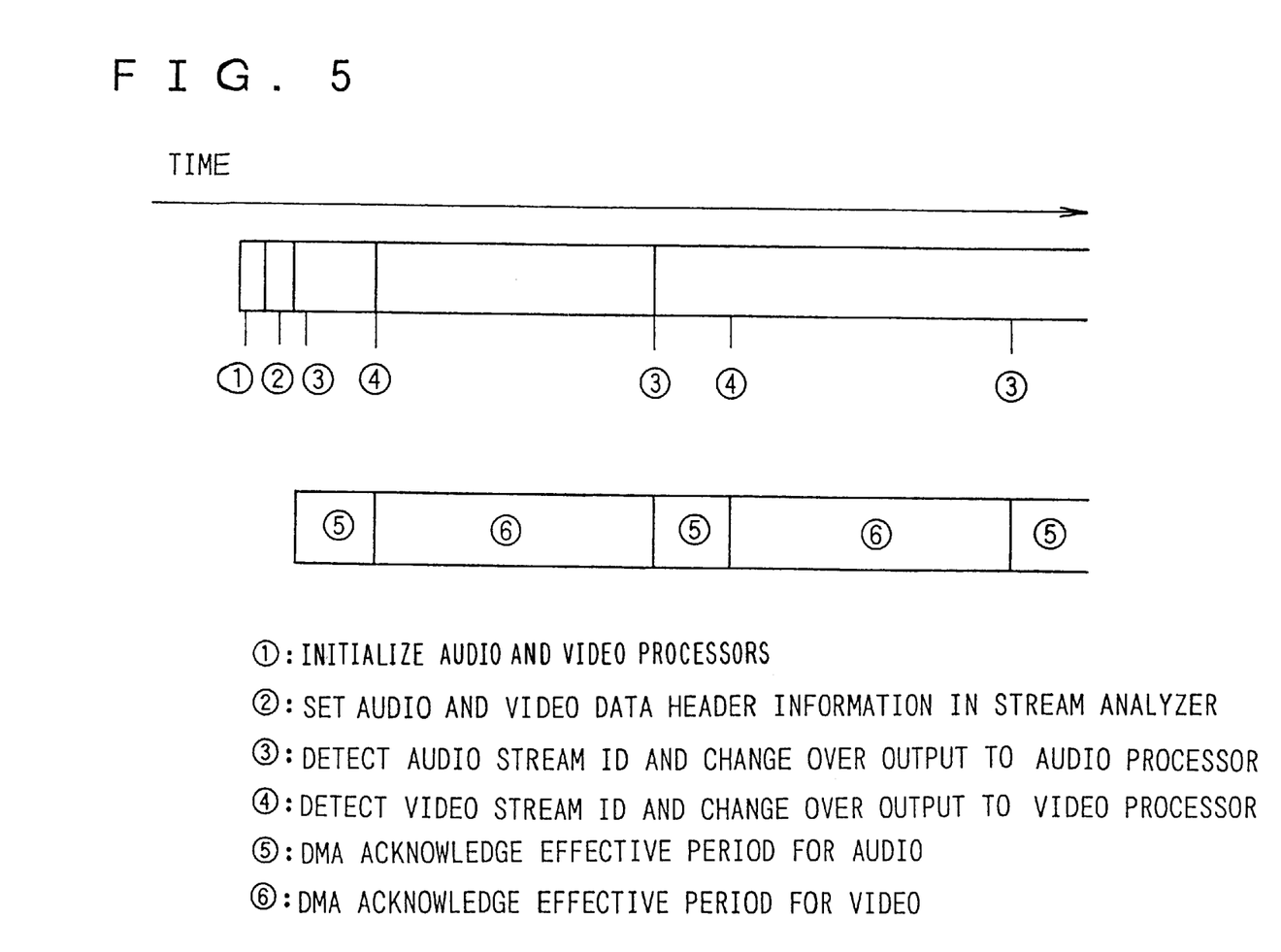
FIG. 5 which is a diagram useful in describing an embodiment of the present invention, schematically shows a data transfer and changeover of an acknowledge signal by a stream selector.

FIG. 5 is a diagram schematically illustrating the procedure of the DMA transfer as well as the flow of data to each data processor.

Operation will be described, with reference also to FIGS. 1 and 3, in regard to processing for a case where the AV data stream 305 having the interleaved video data and audio data is transferred by DMA, the stream ID is detected, the stream is separated into audio data and video data, the audio data is transferred to the audio processor 308 and the video data is transferred to the video processor 309.

First, the CPU 301 initially sets the audio processor 308 and the video processor 309, after which the processors 308 and 309 activate ((1) in FIG. 5) the DMA request signals 118, 121 (see FIG. 1).

The multiplexer 102 in the stream selector 307 activates the DMA request signal 110 in a case where either the DMA request signal 118 or DMA request signal 121 is active.

Next, the CPU 301 extracts the stream ID of the audio data and the stream ID of the video data that have been registered in the header of the AV data stream 305 and stores both IDs in the stream ID register 104 of the stream selector 307 ((2) in FIG. 5). At this time the stream ID of the audio data is stored in the register within the stream ID register 104 that corresponds to the acknowledge controller 106 and the stream ID of the video data is stored in the register within the stream ID register 104 that corresponds to the acknowledge controller 107.

Next, the CPU 301 sets a DMA parameter in the DMA controller 306 and starts the operation of the DMA controller 306. At this time the CPU 301 sets a starting address in such manner that the stream header (see FIG. 4) will not be transferred.

In accordance with the value that has been set by the CPU 306, the DMA controller 301 reads data out of the AV data stream 305 in memory 302 and transfers the read data to the stream selector 307.

The stream ID detector 103 (see FIG. 1) in the stream selector 307 compares the data streams sent through the system bus 112 and contents 113 of all stream IDs that have been stored in the group of registers in stream ID register 104.

In a case where data that matches stream ID information registered in the stream ID register 104 has been detected in a data stream, the data is judged to be the beginning portion of an interleaved data stream and the acknowledge controller validity signal is changed over.

For example, in a case where a data stream agrees with an audio stream ID that has been registered in the stream ID register 104, the acknowledge controller validity signal 115 is validated and the acknowledge controller validity signal 117 is invalidated, as indicated at (3) in FIG. 5.

In a case where the stream ID add-on flag 114 is valid, the acknowledge controller A validity signal 115 is validated and the acknowledge controller 106 controls the acknowledge signal 119 and processor control signal 120 in accordance with the DMA acknowledge signal 111 from the DMA controller 306, and outputs the stream ID data to the processor 108.

If a stream ID has been detected in a case where the stream ID add-on flag 114 is invalid, all acknowledge controller validity signals inclusive of the acknowledge controller validity signal 115 are invalidated, the acknowledge controller 106 does not output the data prevailing at this time to the processor 108; and the stream ID detector 103 validates the acknowledge controller validity signal 115 after the DMA acknowledge signal 111 from the DMA controller 306 is invalidated.

From this point onward, the acknowledge controller validity signal 115 is held valid until a stream ID other than the audio stream ID is detected by the stream ID detector 103. The acknowledge controller (A) 106 controls the DANA acknowledge signal 119 and processor control signal 120 in accordance with the DMA acknowledge signal 111 from the DMA controller 306 so that the data output by the stream ID detector 103 continues being output to the processor 108.

In a case where the stream ID detector 103 has detected data that agrees with a video stream ID registered in the stream ID register 104 ((4) in FIG. 5), the acknowledge controller (A) validity signal 115 is invalidated and the acknowledge controller (V) validity signal 117 is validated.

In a case where the stream ID add-on flag 114 is valid, then, as in the above-mentioned case in which the stream ID of the audio data is detected, the acknowledge controller (V) validity signal 117 becomes valid. The acknowledge controller (V) 107, therefore, controls the acknowledge signal 122 and processor (V) control signal 123 in accordance with the DMA acknowledge signal 111 from the DMA controller 306 and outputs the stream ID data to the processor 109.

If a stream ID has been detected in a case where the stream ID add-on flag 114 is invalid, all acknowledge controller validity signals inclusive of the acknowledge controller (V) validity signal 117 are invalidated, the acknowledge controller (V) 107 does not output the data prevailing at this time to the processor (V) 109, and the stream ID detector 103 validates the acknowledge controller validity signal 117 after the DMA acknowledge signal 111 from the DMA controller 306 is invalidated.

From this point onward, the acknowledge controller (V) validity signal 117 is held valid until a stream ID other than the video stream ID is detected by the stream ID detector 103. The acknowledge controller (V) 107 controls the DMA acknowledge signal (V) 122 and processor (V) control signal 123 in accordance with the DMA acknowledge signal 111 from the DMA controller 306 so that the data output by the stream ID detector 103 continues being output to the processor (V) 109.

Next, a method of transferring several data streams in memory 302 (see FIG. 3) using one DMA channel will be described as an embodiment of the present invention with reference to FIG. 6 taking as an example a case in which audio data and video data is transferred. As shown in FIG. 6, two data streams, namely audio data A1, A2, A3, . . . and video data V1, V2, V3, . . . , are interleaved and transmitted as a single data stream via one DMA channel.

With reference again to FIG. 3, the CPU 301 provides a stream ID specific to audio data and another stream ID specific to video data and stores these IDs in prescribed registers of the stream ID register 104 (see FIG. 1) in the stream selector 307.

Next, the CPU 301 adds the corresponding stream ID onto the beginning of the transferred data per each DMA and starts up the DMA controller 306 to perform a DMA transfer. The stream ID detector 103 in the stream selector 307 distributes the data to the appropriate processor in accordance with the detected stream ID in a manner similar to that described above.

Second Embodiment

A second embodiment of the present invention will now be described with reference to FIG. 2.

According to the second embodiment of the present invention, a data buffer is provided for each DMA requesting processor in order to perform a data transfer correctly if, in a case where a specific DMA requesting processor is not outputting a DMA request signal, data with respect to this DMA requesting processor has been transferred.

Figure 2:
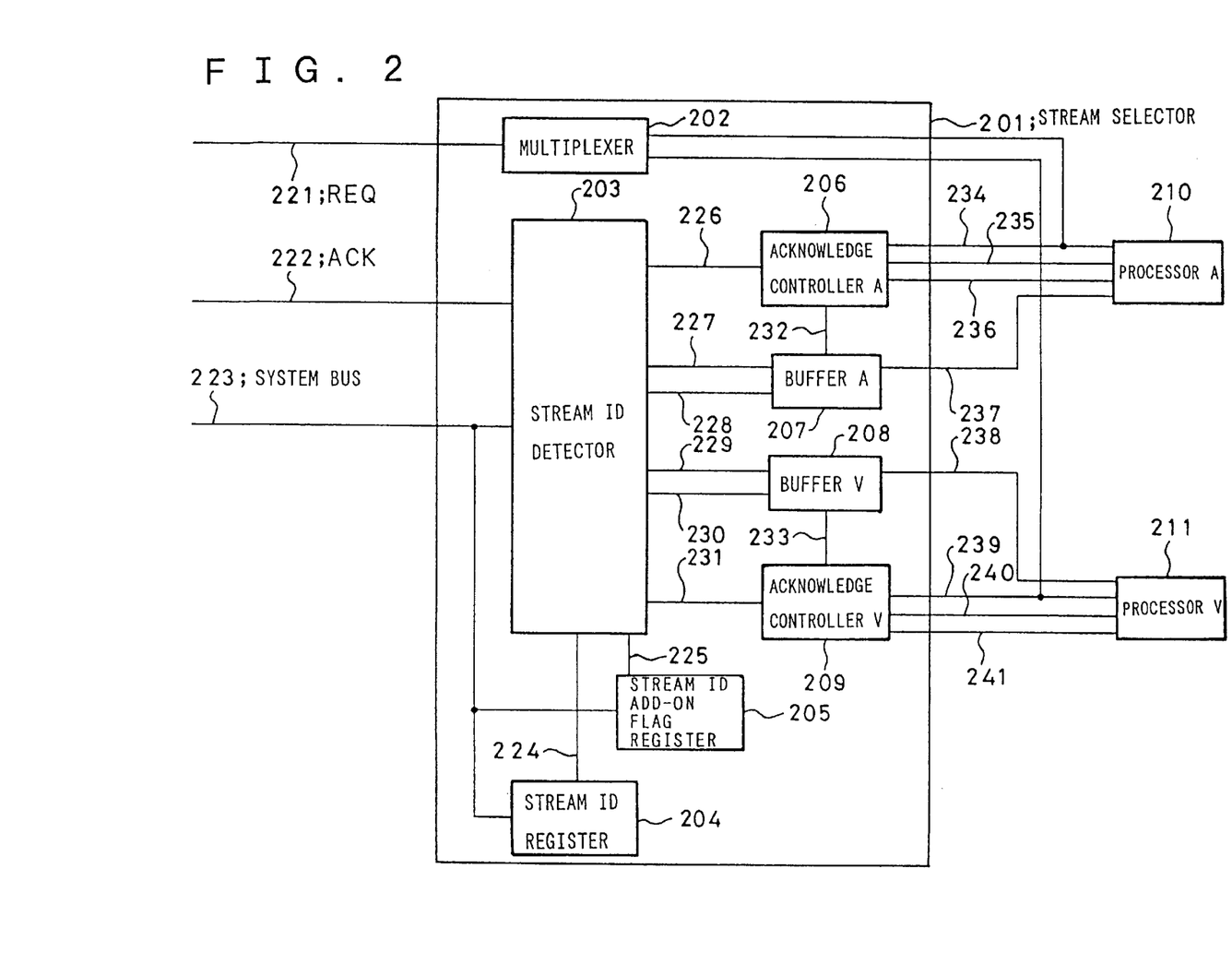
FIG. 2 is a block diagram illustrating the construction of a second embodiment of the present invention.

As shown in FIG. 2, the system according to this embodiment comprises a multiplexer 202 multiplexing DMA request signals from a plurality of DMA requesting processors; a stream ID add-on flag register 205 changing over between operation in which a stream ID is removed from a data stream and the data is then transferred to a data processor or operation in which a data stream is transferred to a data processor with the stream ID left added on; a stream ID register 204 registering stream IDs the number of which is the same as the number DMA requesting processors; a data buffer (A) 208 storing data applied to a processor (A) 210; a data buffer (V) 209 storing data applied to a processor (V) 211; an acknowledge controller (A) 206 controlling a DMA acknowledge signal 235 and an access control signal 236 to the processor 210 in accordance with a DMA request signal 234 from the processor 210 to thereby transfer data 237 from the data buffer (A) 207; an acknowledge controller (V) 209 controlling a DMA acknowledge signal 240 and an access control signal 241 to the processor 211 in accordance with a DMA request signal 239 from the processor 211 to thereby transfer data 238 from the data buffer (A) 208; and a stream ID detector 203 comparing a plurality of stream IDs that have been stored in the stream ID register 204 and data streams transferred by DMA, switching between enabling/disabling of each acknowledge controller based upon a stream add-on flag value 225 and results of the comparison, and outputting data streams to the data buffers 207, 208.

In the arrangement of FIG. 2, there are two processors which issue DMA requests. In a case where there are three or more processors for processing data, the number of acknowledge controllers, the number of registers in the stream ID register and the number of data buffers would be the same as the number of processors.

In a system of the kind shown in FIG. 3 for reproducing audio and video, there are cases where each of audio and video processors inactivates the DMA request signal temporarily so that an internal buffer will not overflow. Accordingly, in the second embodiment of the present invention, the stream ID detector 203 writes data to a data buffer that corresponds to the ID stream currently being selected and, in a case where data is present in the corresponding data buffer, the acknowledge controller outputs the data in this data buffer to the corresponding processor.

Figure 7:
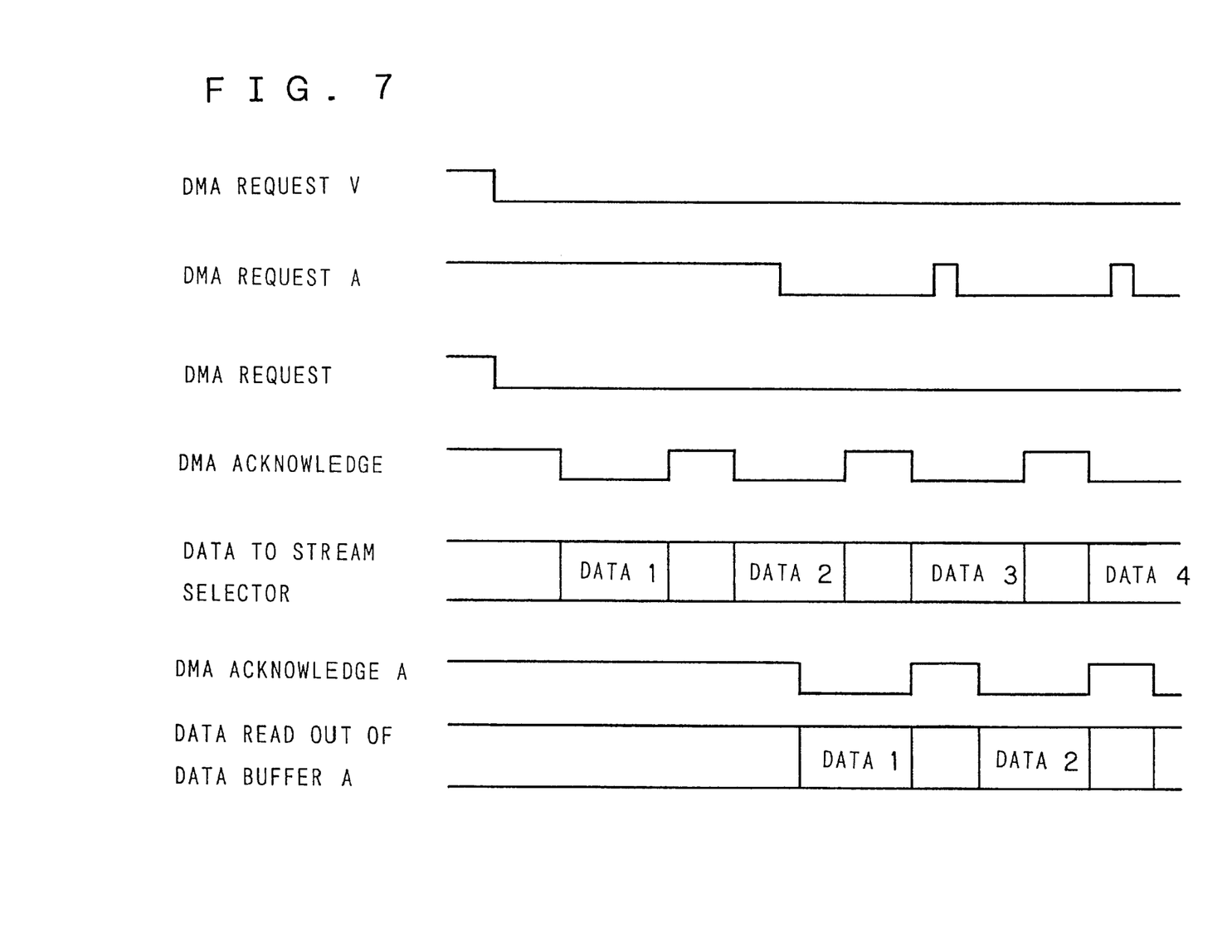
FIG. 7 is a timing chart illustrating the operation of a data buffer in the second embodiment of the present invention.

FIG. 7 is a timing chart useful in describing operation when audio data is transferred in a case where the DMA request signal A of the processor 210 shown in FIG. 2 is temporarily inactive.

The multiplexer 202 generates a DMA request signal (REQ) 221 from the DMA request signal (A) 234 from the processor (A) 210 and the DMA request signal (V) 239 from the processor (V) 211. In a state in which audio data (DATA 1) is transferred to the stream selector by DMA transfer, the DMA request signal (REQ) 221 is not active. However, the stream ID detector 203 writes successively transferred data to the buffer (A) 207. If the processor (A) 210 outputs the DMA request signal (A) 234 in a case where data is present in the buffer (A) 207, the acknowledge controller (A) reads the data out of the buffer (A) 207, activates the DMA acknowledge signal (A) 235 to the processor (A) 210 and outputs the data.

As described above, the present invention provides the following advantages:

(1) A first advantage of the present invention is that interleaved data streams of a plurality of types can be separated into individual data streams by detecting a stream ID that has been added onto the beginning of each data stream. As a result, it is possible for plural types of data in a single data stream to be distributed to the appropriate data processors.

(2) A second advantage of the present invention is that specific stream IDs are set with respect to a plurality of streams transferred by DMA transfer, and a CPU adds a stream ID onto the beginning of transferred data at the time of DMA transfer, whereby stream analyzing means can distribute data correctly to specific data processors. As a result, not only can interleaved data be distributed but it is also possible to process a plurality of DMA requests with regard to a plurality of data streams the number of which is greater than the number of DMA controller channels.

As many apparently widely different embodiments of the present invention can be made without departing from the spirit and scope thereof, it is to be understood that the invention is not limited to the specific embodiments thereof except as defined in the appended claims.

What is claimed is:

1. A system which performs data transfer using direct memory access (DMA) transfer in response to requests from a plurality of DMA transfer requesting devices, comprising:

means for detecting a plurality of stream identifications corresponding to a plurality of different types of data from a data stream in which the plurality of different types of data have been interleaved on a single DMA channel;

means for, on the basis of the stream identification that has been detected, separating the data corresponding to the detected stream identification from the data stream; and means for distributing the separated data to the direct memory access transfer requesting device that corresponds to said detected stream identification.

2. The system according to claim 1, further comprising:

means for storing the steam identifications corresponding to the different types of data that have been interleaved in the data stream, in a header position of the data stream; and means for storing one of said stream identifications with each data portion of the data stream.

3. A direct memory access (referred to as "DMA" hereinafter) transfer system for performing transfer of a data stream using direct memory access, comprising:

(a) a multiplexer multiplexing DMA request signals from a plurality of processors issuing direct memory access requests;

(b) a stream add-on control information storage unit controlling changeover between a first operation in which stream identifications of the data stream are removed from the data stream before the data stream is transferred to a requesting processor and a second operation in which the data stream is transferred to the requesting processor with the stream identifications left added on;

(c) a stream identification storage unit capable of registering stream identifications corresponding to the processors issuing DMA requests;

(d) acknowledge controllers corresponding to said processors and which are provided to correspond to respective ones of the processors, said acknowledge controllers issuing a DMA acknowledge signal and an access control signal to the processors; and (e) a stream identification detector comparing the stream identifications that have been stored in said stream identification storage unit and the data stream, switching between enabling/disabling of said acknowledge controllers based upon a value stored in said stream add-on control information storage unit and results of comparison, and outputting the data stream;

(f) wherein by detecting the stream identifications in the transferred data stream, a data stream having a plurality of data types can use one DMA channel in a time-shared fashion.

4. The direct memory access transfer system according to claim 3, wherein said acknowledge controllers are present in the same number as that of said processors.

5. A direct memory access (referred to as "DMA" hereinafter) transfer system comprising:

(a) a multiplexer for multiplexing DMA request signals from a plurality of processors issuing DMA requests for transfer of a data stream by DMA;

(b) a stream add-on control information storage unit controlling changeover between a first operation in which stream identifications of the data stream are removed from the data stream before the data stream is transferred to a requesting processor and a second operation in which the data stream is transferred to the requesting processor with the stream identifications left added on;

(c) a stream identification storage unit capable of registering stream identifications corresponding to the processors issuing direct memory access requests;

(d) data buffers corresponding to the processors issuing DMA requests;

(e) acknowledge controllers corresponding to the processors, said acknowledge controllers issuing DMA acknowledge signals and access control signals to the respective processors to thereby transfer data from said data buffers to the processors; and (f) a stream identification detector comparing the stream identifications that have been stored in said stream identification storage unit and the data stream, switching between enabling/disabling of said acknowledge controllers based upon a value stored in said stream add-on control information storage unit and results of comparison, and outputting data streams to said data buffers;

(g) wherein by detecting the stream identifications in the transferred data stream, a data stream having a plurality of data types can use one DMA channel in a time-shared fashion.

6. The direct memory access transfer system according to claim 5, wherein said stream identifications are present in a same number as that of said processors.

7. The direct memory access transfer system according to claim 5, wherein said data buffers are present in a same number as that of said processors.

8. The direct memory access transfer system as defined in claim 5, wherein said acknowledge controllers are present in a same number as that of said processors.

9. A direct memory access (DMA) transfer method in a computer having a plurality of DMA transfer requesting devices, comprising the steps of:

detecting a plurality of stream identifications corresponding to a plurality of different types of data from a data stream in which the plurality of different types of data have been interleaved on a single DMA channel;

on the basis of the stream identification that has been detected, separating the data corresponding to the detected stream identification from the data stream; and distributing the separated data to the direct memory access transfer requesting device that corresponds to said detected stream identification.

10. The method according to claim 9, further comprising the steps of:

storing the steam identifications corresponding to the different types of data that have been interleaved in the data stream, in a header position of the data stream; and storing one of said stream identifications with each data portion of the data stream.

11. A computer comprising:

a central processing unit (CPU), a memory unit, a plurality of peripheral units issuing direct memory access (hereinafter referred to as "DMA") requests, a system bus adapted to communicate between said units, a DMA controller unit communicable with said system bus, and controllable by said CPU, and a stream selector unit communicable with said DMA controller unit and said system bus, said stream selector unit being adapted to distribute a data stream to said plurality of peripheral units on a time-shared basis, said stream selector unit comprising:

(a) means for detecting a plurality of stream identifications corresponding to a plurality of different types of data from the data stream in which the plurality of different types of data have been interleaved on a single DMA channel;

(b) means for, on the basis of the stream identification that has been detected, separating the data corresponding to the detected stream identification from the data stream; and (c) means for distributing the separated data to the direct memory access transfer requesting peripheral unit that corresponds to said detected stream identification.

12. The computer according to claim 11, wherein said stream selector unit further comprises:

means for storing the steam identifications corresponding to the different types of data that have been interleaved in the data stream, in a header position of the data stream; and means for storing one of said stream identifications with each data portion of the data stream.

13. The computer according to claim 11, wherein said peripheral units comprise data processor units.

14. The computer according to claim 13, wherein said processor units comprise a video processor unit and an audio processor unit.

15. A computer comprising:

a central processing unit CPU, a memory unit, a plurality of peripheral units issuing direct memory access (hereinafter referred to as "DMA") requests, a system bus adapted to communicate between said units, a DMA controller unit communicable with said system bus, and controllable by said CPU, and a stream selector unit communicable with said DMA controller unit and said system bus, said stream selector unit being adapted to distribute data portions from a data stream having a plurality of data types to said plurality of peripheral units in a time-shared fashion, wherein said stream selector unit comprises:

(a) a multiplexer multiplexing DMA request signals from said plurality of peripheral units issuing DMA requests;

(b) a stream add-on control information storage unit controlling changeover between a first operation mode in which stream identifications of the data stream are removed from the data stream before the data stream is transferred to a requesting peripheral unit and a second operation mode in which the data stream is transferred to the requesting peripheral unit with the stream identifications left added on;

(c) a stream identification storage unit capable of registering stream identifications corresponding to said peripheral units issuing DMA requests;

(d) acknowledge controllers corresponding to respective ones of the peripheral units, said acknowledge controllers issuing a DMA acknowledge signal and an access control signal to the peripheral units in accordance with DMA acknowledge signals from the DMA controller unit; and (e) a stream identification detector comparing the stream identifications that have been stored in said stream identification storage unit and the data stream, switching between enabling/disabling of said acknowledge controllers based upon value stored in said stream add-on control information storage unit and results of comparison, and outputting a data stream;

(f) wherein by detecting the stream identifications in the transferred data stream, a data stream having a plurality of data types can use one DMA channel in a time-shared fashion.

16. The computer according to claim 15, wherein said peripheral units comprise data processor units.

17. The computer according to claim 16, wherein said processor units comprise a video processor unit and an audio processor unit.

18. A computer comprising:

a central processing unit (CPU), a memory unit, a plurality of peripheral units issuing direct memory access (hereinafter referred to as "DMA") requests, a system bus adapted to communicate between said units, a DMA controller unit communicable with said system bus, and controllable by said CPU, and a stream selector unit communicable with said DMA controller unit and said system bus, said stream selector unit being adapted to distribute data portions from a data stream to said plurality of peripheral units in a time-shared fashion, wherein said stream selector unit comprises:

(a) a multiplexer for multiplexing DMA request signals from said plurality of peripheral units issuing DMA requests;

(b) a stream add-on control information storage unit controlling changeover between a first operation mode in which stream identifications of the data stream are removed from the data stream before the data stream is transferred to a requesting peripheral unit and a second operation mode in which the data stream is transferred to the requesting peripheral unit with the stream identifications left added on;

(c) a stream identification storage unit capable of registering stream identifications corresponding to peripheral units issuing DMA requests;

(d) data buffers corresponding to the peripheral units issuing DMA requests;

(e) acknowledge controllers, corresponding to said peripheral units, said acknowledge controllers issuing DMA acknowledge signal and access control signal to the respective peripheral units to thereby transfer data from said data buffers to the peripheral units; and (f) stream identification detector comparing the stream identifications that have been stored in said stream identification storage unit and the data stream, switching between enabling/disabling of said acknowledge controllers based upon a value stored in said stream add-on control information storage unit and results of comparison, and outputting data streams to said data buffers;

(g) wherein by detecting the stream identifications in the transferred data stream, a data stream having a plurality of data types can use one DMA channel in a time-shared fashion.

19. The computer according to claim 18, wherein said peripheral units comprise data processor units.

20. The computer according to claim 19, wherein said processor units comprise a video processor unit and an audio processor unit.

* * * * *